United States Patent Office 2,943,129
Patented June 28, 1960

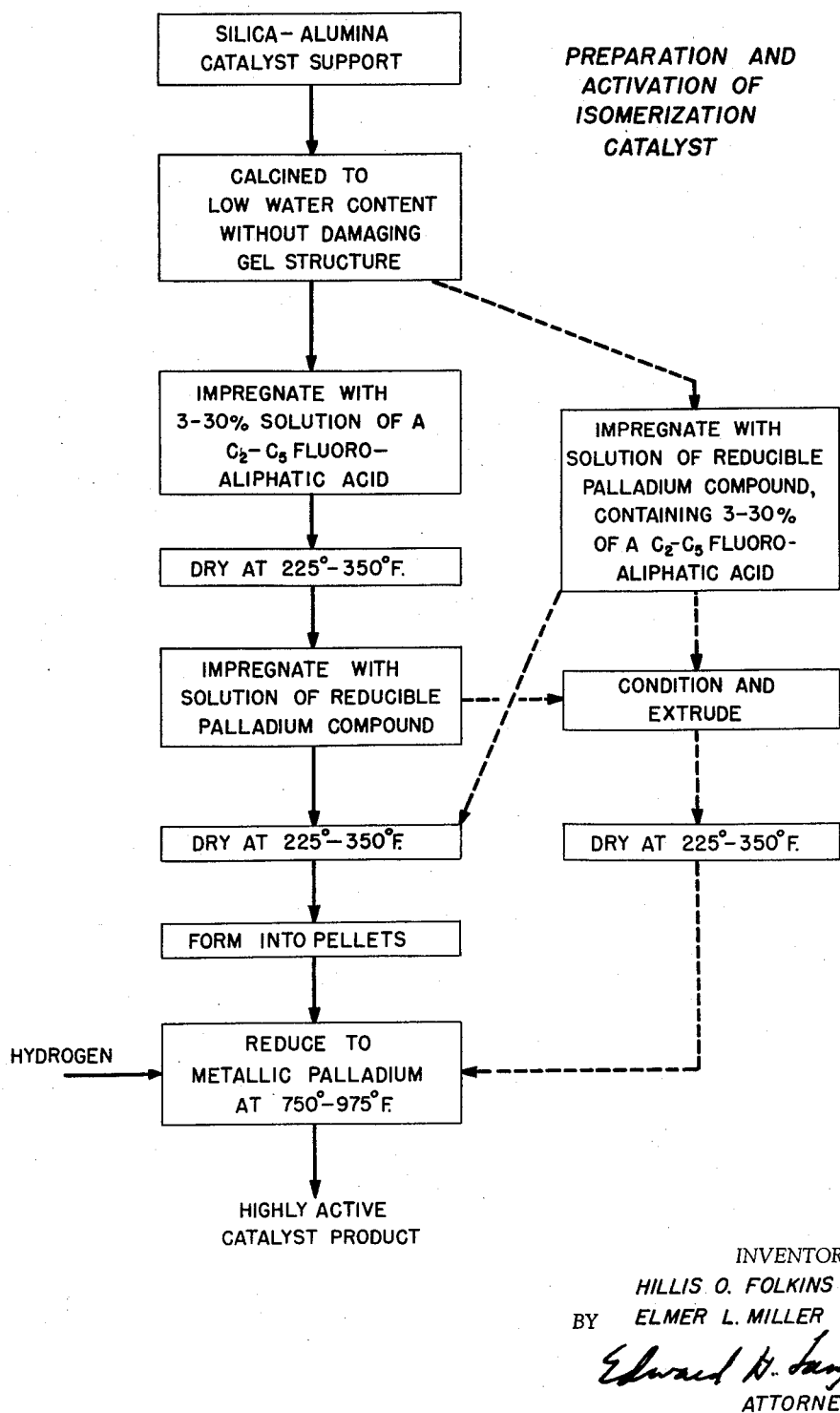

2,943,129
PROCESS AND CATALYST FOR ISOMERIZING NORMAL PARAFFINS

Elmer L. Miller, Cary, and Hillis O. Folkins, Crystal Lake, Ill., assignors to The Pure Oil Company, Chicago, Ill., a corporation of Ohio Filed Oct. 7, 1958, Ser. No. 765,815

19 Claims. (Cl. 260—683.68)

This invention relates to new and useful improvements in processes for the hydroisomerization of normal paraffin hydrocarbons having 4 to 7 carbon atoms per molecule, and more particularly to an improved isomerization catalyst and method of preparing the same.

It has been found that the hydroisomerization of hydrocarbon feed stocks consisting predominantly of normal paraffin hydrocarbons having 4 to 7 carbon atoms per molecule can be efficiently carried out by passing the feed stocks over a catalyst under moderate temperature isomerization conditions. When paraffin hydrocarbons are isomerized in this manner, a mixture of hydrogen and the hydrocarbon in a hydrogen-hydrocarbon mol ratio in the range from about 0.5 to 5.0 is passed over a composite catalyst (prepared and activated in accordance with this invention) at a pressure within the range of about 100–1000 p.s.i.g., and a temperature within the range of about 650°–800° F. The most effective composite catalyst for the isomerization of normal paraffin hydrocarbons under the conditions just described consists of an acidic silica-alumina support having deposited thereon from 0.01–1.0 wt. percent of a group VIII noble metal, such as palladium. In accordance with this invention, it has been found that the treatment of the silica-alumina support with a $C_2$–$C_5$ fluoro-aliphatic acid, either prior to or concomitantly with the deposition of palladium on the support, produces an isomerization catalyst having superior isomerization activity.

It is therefore one object of this invention to provide an improved process for the preparation of a highly active isomerization catalyst.

Another object of this invention is to provide a highly active isomerization catalyst capable of effecting the isomerization of low-molecular-weight normal paraffins to isoparaffins in high yield.

Another object of this invention is to provide an improved process for the isomerization of hydrocarbon feed stocks consisting predominantly of low-molecular-weight normal paraffin hydrocarbons.

A feature of this invention is the provision of a process for the preparation of a highly active isomerization catalyst in which a silica-alumina support is treated with an aqueous solution of a $C_2$–$C_5$ fluoro-aliphatic acid, such as fluoroacetic acid, difluoroacetic acid, or trifluoroacetic acid, and with a solution of a reducible group VIII noble metal (palladium, platinum, etc.) compound, and the impregnated support reduced with hydrogen at elevated temperatures to produce a highly active catalyst.

Another feature of this invention is the provision of an improved isomerization catalyst consisting of 0.01–1.0 wt. percent of a group VIII noble metal, such as palladium, on silica-alumina, containing 50–95% silica, in which the silica-alumina support has been treated with an aqueous solution of a fluoro-aliphatic acid, such as fluoroacetic acid, difluoroacetic acid, or trifluoroacetic acid, either prior to or concomitantly with the impregnation of the support with the noble metal compound.

A further feature of this invention is the provision of an improved process for isomerization of normal paraffin hydrocarbons in which said hydrocarbons are passed with hydrogen at an elevated pressure, and a temperature in the range of about 650°–800° F. over a catalyst consisting of 0.01–1.0 wt. percent palladium, or other group VIII noble metal, on silica-alumina, containing 50–95% silica, which catalyst has been treated with an aqueous solution of a fluoroaliphatic acid prior to or concomitantly with the deposition of the noble metal thereon.

Other objects and features of this invention will become apparent from time to time throughout the specification and claims as hereinafter related.

In the accompanying drawing, there is shown a flow diagram of our improved method of preparing isomerization catalysts.

According to this invention, it has been found that the effectiveness of a group VIII noble metal promoted silica-alumina, composite isomerization catalyst can be enhanced by treating the silica-alumina support with an aqueous solution of a fluoro-aliphatic acid, such as fluoroacetic acid, difluoroacetic acid, or trifluoroacetic acid, either prior to or concomitantly with the deposition of the noble metal thereon. In the preparation of a catalyst composition in accordance with this invention, palladium metal is incorporated in the silica-alumina support by impregnation of the support with a solution of a reducible palladium salt, such as the chloride or nitrate, or with a solution of a mixed palladium salt, such as ammonium chloropalladite. The preparation of the catalyst is generally carried out by impregnating the support with an aqueous solution of palladium chloride, sometimes containing small amounts of an inorganic acid, such as hydrochloric acid. In our process, the catalyst support is wetted with a dilute solution, e.g., 0.5–10%, of a fluoro-aliphatic acid, such as trifluoroacetic acid. Other acids which may be used include any $C_2$–$C_5$ aliphatic acid substituted with one or more fluorine atoms, such as fluoroacetic acid, difluoroacetic acid, fluoropropionic acid, pentafluoropropionic acid, heptafluorobutyric acid, and nonafluorovaleric acid. The perfluoroacids, however, are preferred. The catalyst support used is silica-alumina, containing 50–95 wt. percent silica, which has been dried to a water content in the range from about 1 to 50%. The catalyst support which has been wetted with the trifluoroacetic acid solution is dried at 225°–350° F., preferably at about 230° F. The catalyst support is impregnated with a solution of a reducible palladium salt, preferably palladium chloride or palladium nitrate. The impregnated catalyst is dried and then formed into pellets by a suitable pelleting machine, or may be extruded before drying and cut into pellets, if desired. If the catalyst is to be extruded, it is necessary that the catalyst support never be dried to a water content less than about 20% prior to impregnation with the palladium salt solution and the impregnated catalyst contain about 50–65 wt. percent of water at the time of extrusion. After extrusion, the catalyst is dried at about 225°–350° F. and is activated by reduction with hydrogen at a temperature of about 750°–975° F. The catalyst which is thus produced has a concentration of palladium metal thereon which is determined by the concentration of the solution of palladium salt used to impregnate the catalyst support.

As an alternative method of preparing the catalyst, the acid-treating step and impregnation with palladium salt may be combined. In this method, the palladium salt is added in solution in 0.5–10% aqueous trifluoroacetic acid, preferably 5% trifluoroacetic aicd. The catalyst which is prepared and activated as above described is a much more active catalyst and produces higher yields of isoparaffins than does a catalyst prepared in the same manner without the acid treatment of the catalyst support. This acid treatment is similarly effective with other noble metal catalysts, such as platinum, rhodium, etc., or mixtures thereof, supported on an acidic silica-alumina.

When hydrogen and $C_4$–$C_7$ normal paraffins in a hydrogen-hydrocarbon mol ratio within the range of about 0.5–5.0 are passed over a catalyst prepared and activated, as above described, at a temperature of about 650°–800° F., a pressure of 100–1000 p.s.i.g., and a liquid volume hourly space velocity of 0.5–25.0, a yield of isoparaffins is obtained which is much higher than is obtained at the same conditions using a catalyst of the same composition which has not had this acid treatment or which has been treated with hydrochloric acid.

The following non-limiting examples illustrate the preparation of palladium-containing isomerization catalysts, both with and without the fluoro-substituted acid treatment, and the relative activities of such catalysts in the hydroisomerization of low-molecular-weight normal paraffin hydrocarbons.

EXAMPLE I

A commercial silica-alumina cracking catalyst, containing 75% silica and 25% alumina, was dried at 400° F. for a period of 3 hours. A 250 g. portion of the catalyst support was impregnated at 120° F. with 250 cc. of 5% aqueous trifluoroacetic acid. The catalyst was dried at 230° F. for 16 hours. The catalyst support was then impregnated with an aqueous solution containing 0.18% palladium, as palladium nitrate. The impregnated catalyst was then dried at 230° F., pelleted, and activated by reduction with hydrogen at 975° F. After reduction with hydrogen, the catalyst pellets contained 0.18% palladium metal. The catalyst thus prepared was evaluated in the isomerization of n-pentane.

Hydrogen and n-pentane in a 1:1 mol ratio were circulated over the catalyst pellets at a temperature of 700° F., a pressure of 500 p.s.i.g., and a liquid volume hourly spaced velocity of 3.0. The liquid volume hourly space velocity is defined as the liquid volume of hydrocarbons fed per hour per unit volume of effective catalyst bed. Under the above reaction conditions, isopentane was obtained in a yield of 60.4%.

In another experiment, an additional amount of the catalyst was prepared using the above-described procedure, except that the amount of palladium nitrate in the impregnating solution was increased to an amount sufficient to produce a concentration of 0.40% palladium metal in the catalyst. The catalyst was dried, pelleted, and activated by reduction with hydrogen as above described. This catalyst was evaluated for its activity in the isomerization of n-pentane under the same reaction conditions used with the first catalyst, viz., hydrogen/pentane mol ratio of 1:1, pressure of 500 p.s.i.g., liquid volume hourly space velocity of 3.0, and temperature of 700° F. Under these reaction conditions, isopentane was obtained in a yield of 61.0%. Using this same catalyst, the isopentane yield dropped to 59.7% when the temperature was raised to 725° F. and dropped further to 58.0% when the temperature was raised to 740° F.

EXAMPLE II

A commercial silica-alumina cracking catalyst, containing 87% silica and 13% alumina, was dried to produce a low water content without destroying the gel structure. The catalyst support was then impregnated with a 5% aqueous trifluoroacetic acid solution containing 0.18% palladium (based on the amount of support to be impregnated) dissolved therein in the form of palladium nitrate. The catalyst was dried at 230° F., formed into ⅛" diameter pellets, and activated by reduction with hydrogen at 975° F. The catalyst thus prepared was evaluated as in Example I for activity in the isomerization of n-pentane. Hydrogen and n-pentane in a mol ratio of 1:1, a pressure of 500 p.s.i.g., and a liquid hourly volume space velocity of 3.0, were circulated over the catalyst in three different runs, at 700° F., 725° F., and 740° F. At 700° F., the isopentane yield was 60.9%. At 725° F., the yield was 62.7%, and at 740° F was 61.2%.

EXAMPLE III

A commercial silica-alumina cracking catalyst, containing 75% silica and 25% alumina, was dried to produce a low water content (1–50%) without destroying the gel structure. The catalyst support was then impregnated with a 5% aqueous solution of trifluoroacetic acid containing 0.18% palladium (based on the amount of support to be impregnated) in the form of palladium nitrate. The impregnated catalyst was dried at 230° F., formed into pellets ⅛" in diameter, and activated by reduction with hydrogen at 975° F. The reduced catalyst contained 0.18% palladium metal in a highly active form and 5% trifluoroacetic acid in combination with the support. The catalyst thus prepared was evaluated as in the preceding example for isomerization activity at 700° F., 725° F., and 740° F., using a hydrogen/n-pentane mol ratio of 1:1, a pressure of 500 p.s.i.g., and a liquid volume hourly space velocity of 3.0. At 700° F., isopentane was obtained in a yield of 55.9%. At 725° F., the isopentane yield was 54.1%, while at 740° F., the isopentane yield was 52.9%.

EXAMPLE IV

A commercial silica-alumina cracking catalyst, containing 75% silica and 25% alumina, is dried at 400° F. for a period of 3 hours. Three 250 g. portions of the catalyst support are separately impregnated at 120° F. with 250 cc. portions of 5% aqueous fluoroacetic acid, difluoroacetic acid, and trifluoroacetic acid. These catalysts are dried at 230° F. for 16 hours. The catalyst supports are then impregnated with an aqueous solution containing 0.30% w. palladium, as palladium nitrate. The impregnated catalysts are then extruded, cut into pellets, and dried at 230° F. The catalyst pellets are activated by reduction with hydrogen at 975° F. After reduction with hydrogen, the catalyst pellets contain 0.30% palladium metal. The catalysts thus prepared are compared, as follows, in the isomerization of n-pentane.

In three separate runs hydrogen and n-pentane in a 1:1 mol ratio are circulated over the respective catalyst pellets at a temperature of 700° F., a pressure of 500 p.s.i.g., and a liquid volume hourly space velocity of 3.0. The liquid volume hourly space velocity is defined as the liquid volume of hydrocarbons fed per hour per unit volume of effective catalyst bed. Under the above reaction conditions, isopentane is obtained in yields of 61% for the catalyst treated with trifluoroacetic acid; 57% for the catalyst treated with difluoroacetic acid; and 53% for the catalyst treated with monofluoroacetic acid.

EXAMPLE V

In another series of experiments, catalysts were prepared omitting the trifluoroacetic acid treatment. In each of these experiments a commercial silica-alumina cracking catalyst, containing 87% silica and 13% alumina, or 75% silica and 25% alumina, was impregnated with a dilute (1–2%) hydrochloric acid solution containing palladium chloride in an amount sufficient to produce the desired palladium concentration on the finished catalyst. The catalyst was dried, pelleted, and reduced with hydrogen at about 975° F. as in the other examples. These catalysts were separately evaluated for activity in the isomerization of n-pentane using the same conditions of temperature, pressure, hydrocarbon/hydrogen mol ratio, and flow rate as in the other examples. The iso-pentane yields using these catalysts are tabulated in Table I.

Table I

| Wt. percent Pd | Silica-Alumina | Percent Isopentane Yield |
|---|---|---|
| 0.1 | 75/25 | 20.0 |
| 0.2 | 75/25 | 29.7 |
| 0.3 | 75/25 | 32.5 |
| 0.5 | 75/25 | 39.2 |
| 0.1 | 87/13 | 36.0 |
| 0.2 | 87/13 | 44.1 |
| 0.5 | 87/13 | 44.5 |

From the above examples, it is seen that the treatment of a silica-alumina catalyst support with a 5% solution of trifluoroacetic acid produces a catalyst of substantially higher activity than is produced when the catalyst is merely impregnated with a solution of a palladium salt not containing said acid, or containing a mineral acid such as hydrochloric acid. While the preferred concentration of trifluoroacetic acid is 5%, the concentration of the acid solution may vary from about 0.5% to 10%. Likewise, while the process has been described with special emphasis upon the use of mono-, di-, and tri-fluoroacetic acids, other fluorinated aliphatic acids may be used, although perfluoro acids are preferred. From the data in Table I, it is seen that palladium on silica-alumina catalysts are quite effective in the isomerization of normal paraffin hydrocarbons. The yield of isoparaffins increases markedly between 0.1% and 0.5% palladium. However, further increase in isopentane yield at palladium concentrations above 0.5% is slight and the effective range of concentration of palladium on a silica-alumina support lies between about 0.01% and 1.0%. It is noted from the data in Table I and in the various examples that the best yields of isopentane obtained from catalysts which had not received the trifluoroacetic acid treatment were not as good as the poorest yields obtained from the trifluoroacetic acid treated catalyst.

The operating conditions for isomerization of normal paraffin hydrocarbons using the highly active catalyst of this invention are normally selected so that degeneration or fouling of the catalyst does not occur. These catalysts are much more sensitive to temperature changes than catalysts which have not received the trifluoroacetic acid treatment. Thus, it is necessary to maintain the isomerization reaction temperature within a relatively narrow range. The optimum temperature range is 700°–740° F., while the range from 650°–800° F. represents the extreme temperature limits of use of these catalysts. The catalyst may become fouled after extremely long process periods, or as a result of unusual variations in temperatures or hydrocarbon/hydrogen ratio, and thus may require reactivation or regeneration at intervals of once or twice a year. The regeneration procedure which is followed is one in which the catalyst is oxidized to eliminate carbon deposits and then reduced with hydrogen. The oxidation and reduction temperatures used are such that the catalyst is not subjected to sintering, and the activity of the catalyst thus remains high. The catalyst is oxidized using air or oxygen at a temperature in the range from about 700°–950° F. The catalyst is most effectively regenerated if it is subjected to air at a pressure of 70–130 p.s.i.g. for a period of 2 to 8 hours, at a temperature of 800°–875° F. The oxidized catalyst is then reduced and reactivated by treatment with hydrogen at a temperature in the range from about 750°–950° F. If the optimum conditions of oxidation and reduction of the catalyst are used, the catalyst is regenerated and reactivated to an isomerization activity substantially the same as that of an activated virgin isomerization catalyst of the same composition.

In isomerizing normal paraffin hydrocarbons containing 4 to 7 carbon atoms per molecule, in accordance with this invention, the catalyst used is prepared by treating a silica-alumina support with 0.5–10% trifluoroacetic acid (or other $C_2$–$C_5$ fluorine-substituted aliphatic acid), either prior to or concomitantly with the impregnation of the silica-alumina support with a palladium containing solution. The silica-alumina support which is used must be of an acidic nature and must contain from 50 to 95% silica, with 70–90% silica being preferred. Under the conditions of isomerization used in this process, catalysts supported on pure silica or pure alumina are substantially inoperative. Thus, the catalyst consisting of 0.4 wt. percent platinum on alumina (which would be a good reforming catalyst) will produce a yield of isopentane of only about 15% under the conditions used in the various examples of this specification. Platinum on silica is equally ineffective. The catalyst support of this invention is treated with aqueous trifluoroacetic acid and provided with palladium (in the form of palladium chloride or palladium nitrate) in a concentration of from 0.01 to 1.0%, with a concentration of 0.1 to 0.8% being preferred.

In the isomerization of different $C_4$–$C_7$ normal paraffin hydrocarbons, the optimum isomerization conditions are different for different hydrocarbons as shown in Table II.

Table II

OPTIMUM CONDITIONS FOR ISOMERIZATION OF $C_4$–$C_7$ NORMAL PARAFFIN HYDROCARBONS

| Temp., °F. | Range | Preferred Range |
|---|---|---|
| n-$C_4$ | 700–800 | 725–800 |
| n-$C_5$ | 675–775 | 700–740 |
| n-$C_6$ | 650–740 | 675–725 |
| n-$C_7$ | 600–725 | 625–700 |
| Pressure, p.s.i.g. | 100–1,000 | 350–750 |
| Liquid volume hourly space velocity | 0.5–25.0 | 2–10 |
| $H_2$/hydrocarbon mol ratio | 0.5–5.0 | 1.5–4.5 |

It is apparent that when mixed feed stocks are employed, a compromise must be effected in selecting the temperature which is to be used in order to produce optimum activity and selectivity for the desired isoparaffins without producing substantial amounts of hydrocracking as a concomitant undesirable side reaction. The optimum temperature is one which in most cases must be determined experimentally in accordance with the relative proportions of hydrocarbons in the feed. The maximum efficiency for isomerization of the various $C_4$–$C_7$ hydrocarbons is obtained by passing the hydrocarbon feed through a suitable fractionating system to separate the individual hydrocarbons for isomerization under optimum conditions for each hydrocarbon. The products of each isomerization may then be recombined into a single product.

While we have described our invention fully and completely as required by the patent statutes, with special emphasis upon one or more preferred embodiments, we wish it understood that within the scope of the appended claims, this invention may be practiced otherwise than as specifically described.

What is claimed is:

1. The method of preparing a hydrocarbon isomerization catalyst which comprises impregnating a precalcined silica-alumina catalyst support, containing 50–95 wt. percent silica, with a $C_2$–$C_5$ fluorine-substituted aliphatic acid and a solution of a reducible group VIII noble metal compound, drying the impregnated catalyst support, and reducing the catalyst with hydrogen at 750°–975° F.

2. A method in accordance with claim 1 in which the group VIII noble compound is a palladium compound.

3. A method in accordance with claim 2 in which the catalyst support is impregnated with an aqueous solution of the fluorinated acid.

4. A method in accordance with claim 2 in which the catalyst support is impregnated with a 0.5–10% aqueous solution of the fluorinated acid.

5. A method in accordance with claim 4 in which the acid is selected from the group consisting of fluoroacetic acid, difluoroacetic acid, and trifluoroacetic acid.

6. A method in accordance with claim 2 in which the palladium compound solution is of a concentration and amount sufficient to produce a palladium concentration of 0.01–1.0 wt. percent on the catalyst.

7. A method in accordance with claim 6 in which the catalyst is formed into pellets after drying.

8. A method in accordance with claim 6 in which the catalyst support is impregnated with an aqueous solution of a reducible palladium compound containing 5% trifluoroacetic acid.

9. A catalyst produced in accordance with claim 1.
10. A catalyst produced in accordance with claim 2.
11. A catalyst produced in accordance with claim 4.
12. A catalyst produced in accordance with claim 5.
13. A catalyst produced in accordance with claim 6.
14. A catalyst produced in accordance with claim 8.

15. A method of isomerizing $C_4$–$C_7$ normal paraffin hydrocarbons which comprises passing hydrogen and a normal paraffin hydrocarbon at a temperature in the range from about 650°–800° F., sufficient to effect isomerization, a pressure of about 100–1000 p.s.i.g., a liquid volume hourly space velocity of 0.5–25.0, and a hydrogen/hydrocarbon mol ratio within the range of about 0.5–5.0, over a catalyst prepared and activated in accordance with claim 1.

16. A method of isomerizing $C_4$–$C_7$ normal paraffin hydrocarbons which comprises passing hydrogen and a normal paraffin hydrocarbon at a temperature in the range from about 650°–800° F., sufficient to effect isomerization, a pressure of about 100–1000 p.s.i.g., a liquid volume hourly space velocity of 0.5–25.0, and a hydrogen/hydrocarbon mol ratio within the range of about 0.5–5.0, over a catalyst prepared and activated in accordance with claim 2.

17. A method of isomerizing $C_4$–$C_7$ normal paraffin hydrocarbons which comprises passing hydrogen and a normal paraffin hydrocarbon at a temperature in the range from about 650°–800° F., sufficient to effect isomerization, a pressure of about 100–1000 p.s.i.g., a liquid volume hourly space velocity of 0.5–25.0, and a hydrogen/hydrocarbon mol ratio within the range of about 0.5–5.0, over a catalyst prepared and activated in accordance with claim 4.

18. A method of isomerizing $C_4$–$C_7$ normal paraffin hydrocarbons which comprises passing hydrogen and a normal paraffin hydrocarbon at a temperature in the range from about 650°–800° F., sufficient to effect isomerization, a pressure of about 100–1000 p.s.i.g., a liquid volume hourly space velocity of 0.5–25.0, and a hydrogen/hydrocarbon mol ratio within the range of about 0.5–5.0, over a catalyst prepared and activated in accordance with claim 6.

19. A method of isomerizing $C_4$–$C_7$ normal paraffin hydrocarbons which comprises passing hydrogen and a normal paraffin hydrocarbon at a temperature in the range from about 650°–800° F., sufficient to effect isomerization, a pressure of about 100–1000 p.s.i.g., a liquid volume hourly space velocity of 0.5–25.0, and a hydrogen/hydrocarbon mol ratio within the range of about 0.5–5.0, over a catalyst prepared and activated in accordance with claim 8.

References Cited in the file of this patent

UNITED STATES PATENTS

| | | |
|---|---|---|
| 2,550,531 | Ciapetta | Apr. 24, 1951 |
| 2,623,860 | Haensel | Dec. 30, 1952 |
| 2,642,384 | Cox | June 16, 1953 |
| 2,781,323 | Hunter | Feb. 12, 1957 |
| 2,798,105 | Heinemann et al. | July 2, 1957 |
| 2,831,908 | Starnes et al. | Apr. 22, 1958 |
| 2,841,626 | Holzmann et al. | July 1, 1958 |

FOREIGN PATENTS

| | | |
|---|---|---|
| 487,392 | Canada | Oct. 21, 1952 |